United States Patent
Kashima et al.

(10) Patent No.: US 7,324,753 B2
(45) Date of Patent: Jan. 29, 2008

(54) OPTICAL COMMUNICATION NETWORK USING A CODE DIVISION MULTIPLEXING METHOD

(75) Inventors: Masayuki Kashima, Tokyo (JP); Kazuhiko Matsuno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 518 days.

(21) Appl. No.: 10/752,573

(22) Filed: Jan. 8, 2004

(65) Prior Publication Data

US 2004/0141499 A1 Jul. 22, 2004

(30) Foreign Application Priority Data

Jan. 9, 2003 (JP) ............................. 2003-003117

(51) Int. Cl.
*H04J 14/00* (2006.01)
(52) U.S. Cl. ..................... 398/77; 398/75; 398/78
(58) Field of Classification Search ........ 398/184–191, 398/75–79
See application file for complete search history.

(56) References Cited

U.S. PATENT DOCUMENTS 4,703,474 A * 10/1987 Foschini et al. ............ 370/441
6,574,268 B1 * 6/2003 Bergamo ..................... 375/142
7,076,168 B1 * 7/2006 Shattil ......................... 398/76

OTHER PUBLICATIONS

"xDSL/FTTH textbook", T. Miki, et al. (supervisors), published by ASCH on Oct. 11, 1999.
"ATM-PON", Oki Electric Research & Development, Apr. 200, issue 182, vol. 67, No. 1.
"Gigabit Ethernet textbook" ASCH, K. Seto, et al. (supervisors), published by ASCII on Mar. 11, 1999.

* cited by examiner

*Primary Examiner*—Dzung Tran
(74) *Attorney, Agent, or Firm*—Venable LLP; James R. Burdett; Kyle D. Petaja

(57) ABSTRACT

The present invention is a high-speed and low-cost optical communication network. A preferred embodiment of this optical communication network comprises an accommodation device, optical couplers that are connected to corresponding ports of this accommodation device, and communication terminals that are connected to corresponding optical couplers. Further, data transmitted by the communication terminals to the accommodation device is code-division multiplexed. Because data collision is prevented by means of code division multiplexing, control of the timing with which the communication terminals transmit data is not required. Meanwhile, data transmitted by the accommodation device to the communication terminals is time-division multiplexed because there is no risk of collision.

14 Claims, 9 Drawing Sheets

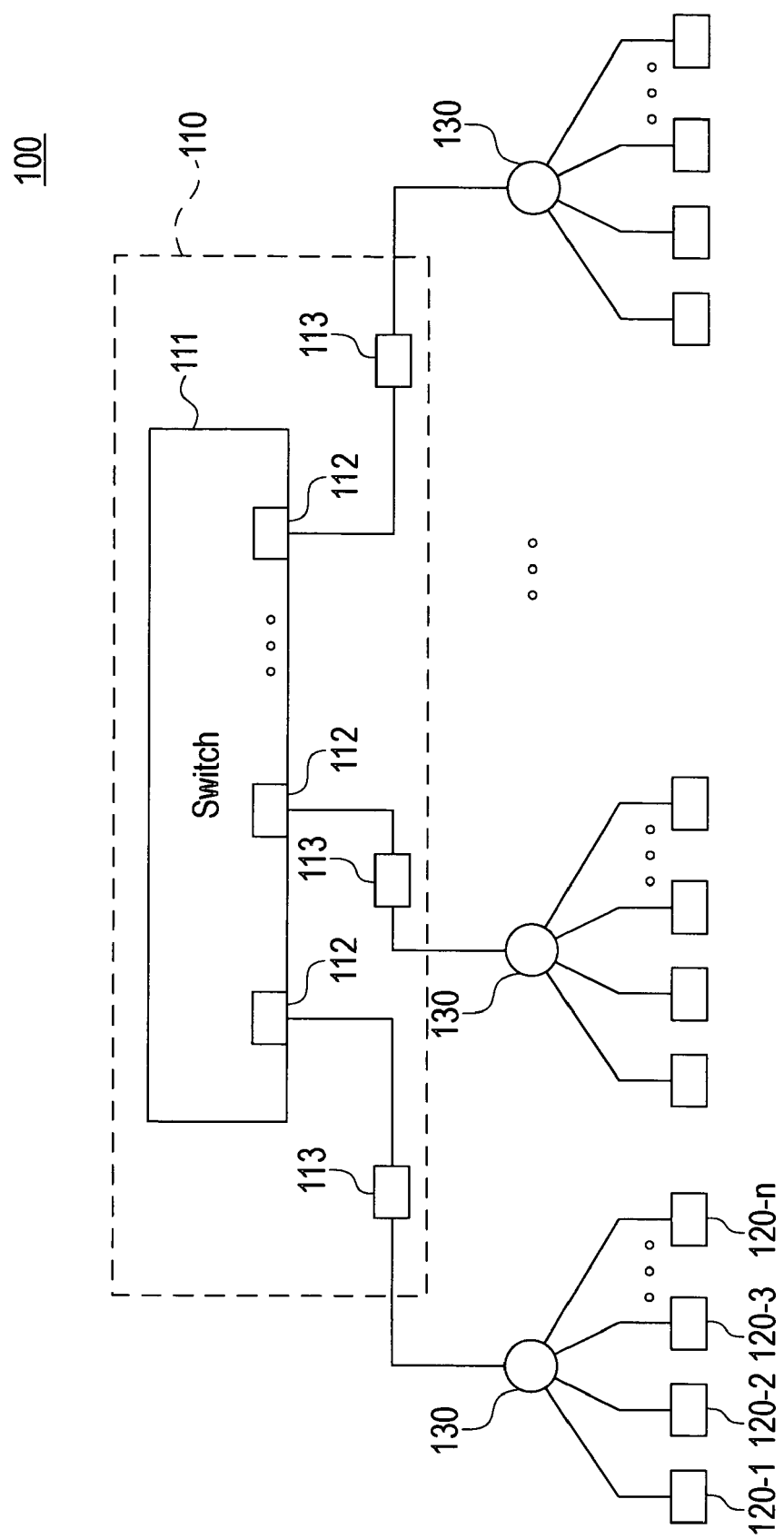

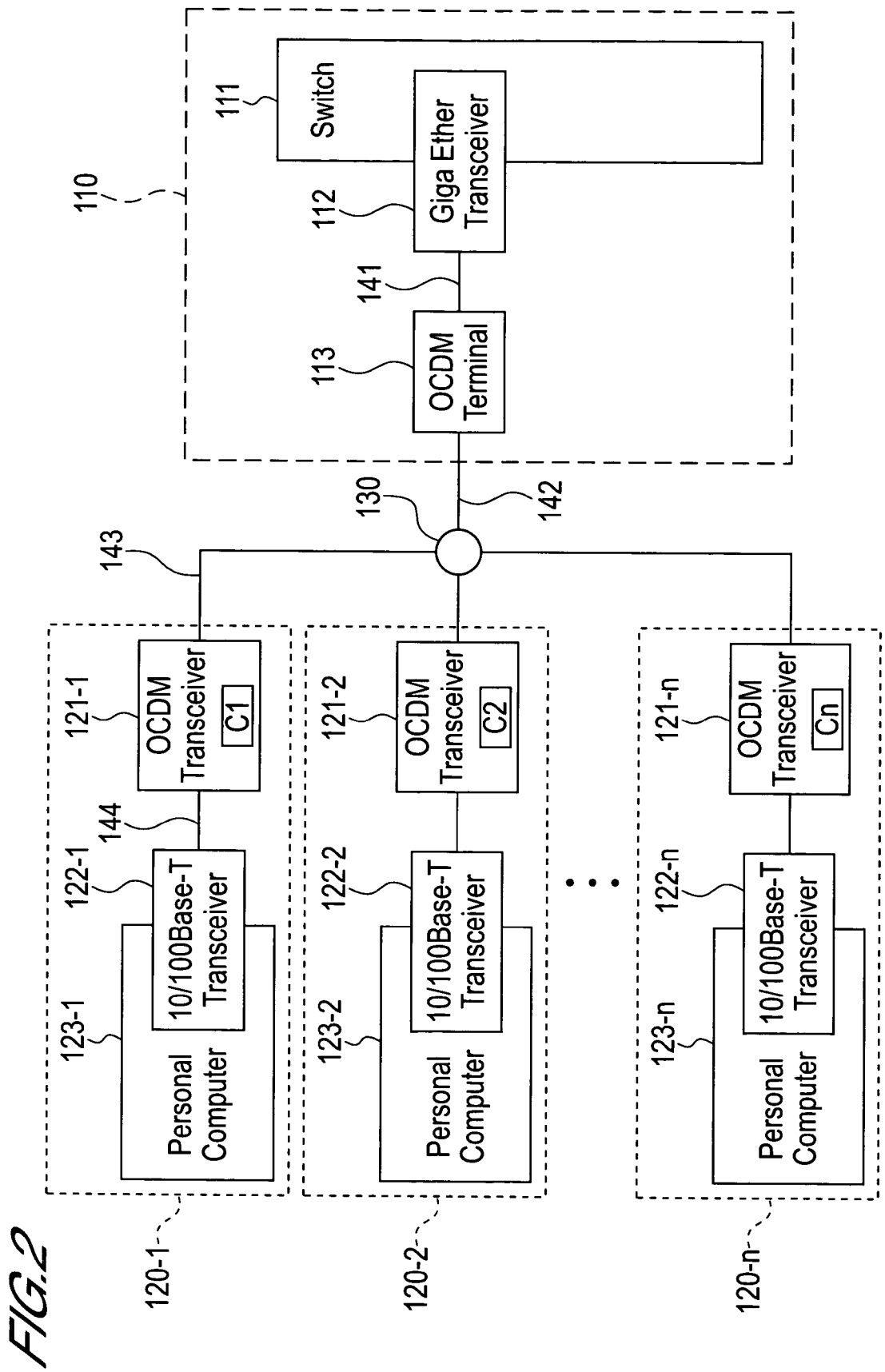

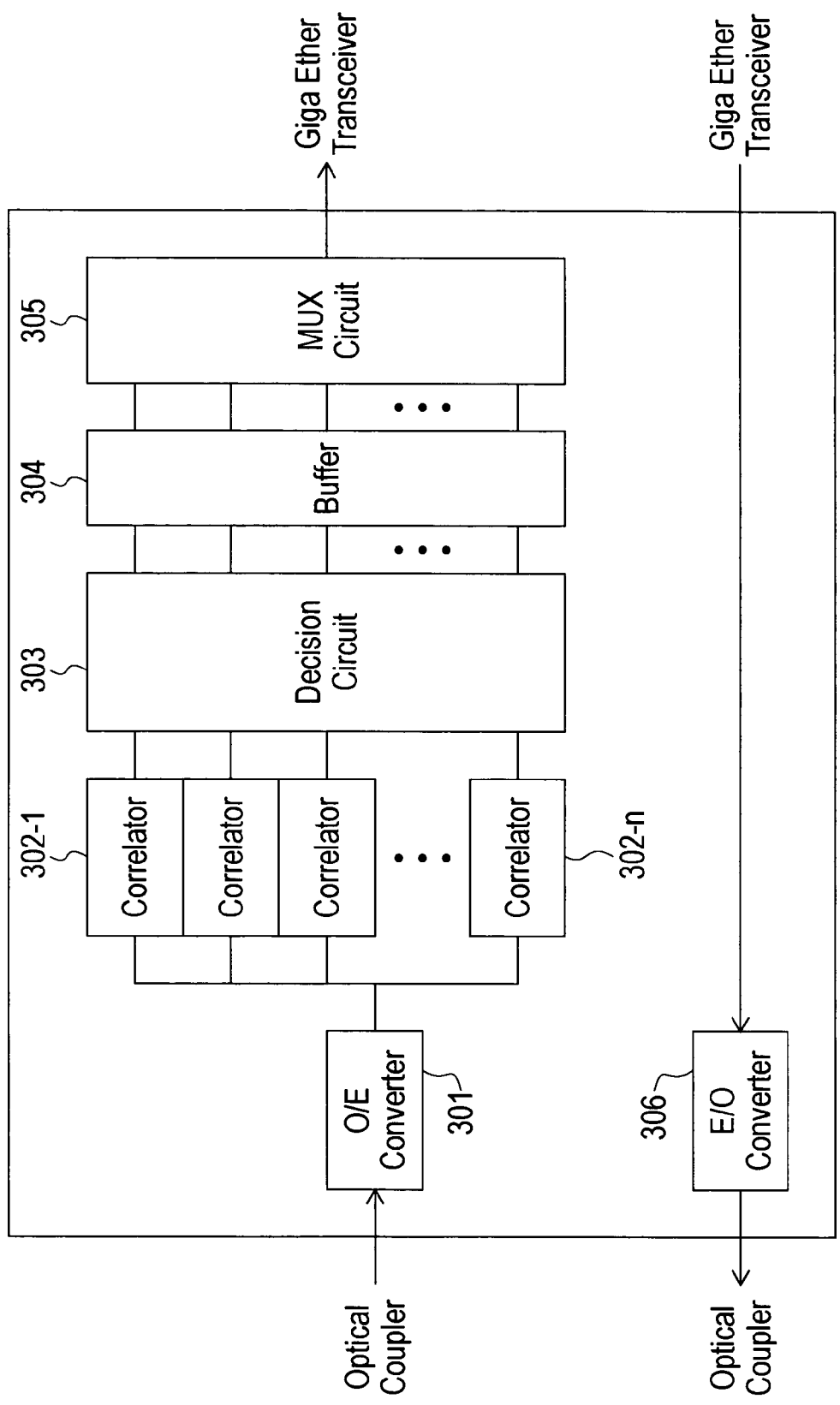

OPTICAL COMMUNICATION NETWORK USING A CODE DIVISION MULTIPLEXING METHOD

BACKGROUND OF THE INVENTION

1. Field of the Invention

The present invention relates to an optical communication network. More precisely, the present invention relates to a technology for adapting Optical Code Division Multiplexing to an optical communication network.

2. Description of Related Art

A network called an FTTx, for example, is known as an optical communication network. An FTTx is a communication network for connecting an accommodation device and subscriber buildings (homes, offices, and so forth) by means of optical fiber. As FTTx, FTTH (Fiber to the Home), FTTN (Fiber to the Neighborhood), FTTB (Fiber to the Building), and so forth, are known, for example. FTTx is used, for example, as an access system for connecting a subscriber computer terminal to the Internet.

As a technology for implementing an FTTx, ATM-PON (Asynchronous Transfer Mode based Passive Optical Network), for example, is known. ATM-PON is able to implement broadband communications, for which optical fiber is used as the access transmission path, at low cost.

ATM-PON connects a single accommodation device (Optical Line Terminal; OLT) and a plurality of communication terminal (Optical Network Unit; ONU) via an optical coupler. In other words, a plurality of ONU is connected to a single optical coupler. Further, the optical coupler and the OLT are connected via a single transmission path. Therefore, the transmission path linking the optical coupler and OLT is shared by a plurality of ONU. In this transmission path, an uplink direction (that is, the direction from the optical coupler to the OLT) communication channel, and a downlink direction (that is, the direction from the OLT to the optical coupler) communication channel are separated by means of Wavelength Division Multiplexing (WDM). In addition, the uplink direction communication channel and downlink direction communication channel are shared by a plurality of ONU by using Time Division Multiplexing (TDM).

Downlink direction Time Division Multiplexing is implemented by performing a simple control. The OLT sequentially transmits ATM cells in which header information for discriminating an addressed ONU is stored. Each ONU judges the destination by using the header information of a received ATM cell and then discards the ATM cells addressed to other ONU destinations.

On the other hand, uplink direction Time Division Multiplexing necessitates more complex control. This is because each ONU must control the timing for transmitting the ATM cells. When a plurality of ONU outputs ATM cells with the same timing, these ATM cells collide within the transmission path linking the optical coupler and the OLT. The information stored in these ATM cells is destroyed by this collision. Therefore, in uplink direction communication, timing control so that the ATM cells that are output by each ONU do not collide with one another.

For the reasons detailed above, ATM-PON requires equipment in order to perform uplink direction timing control. This equipment is responsible for an increase in the assembly costs and maintenance costs of the optical communication network.

SUMMARY OF THE INVENTION

An object of the present invention is to provide a technology for implementing a high speed optical communication network at low cost.

For this reason, the optical communication network according to the present invention comprises: a plurality of transceivers, each of which converts an inputted electrical signal into an optical signal that is spread by using a spreading code and then outputs this spread optical signal; an optical coupler, which inputs spread optical signals from the transceivers and multiplexes these signals; and a terminal that inputs the multiplexed optical signal from the optical coupler and convert the multiplexed optical signal to the pre-spreading electrical signals by using the spreading codes.

The present invention performs Code Division Multiplexing of the transmission data and hence there is no risk of the optical signals that are transmitted by different transceivers colliding. Therefore, the communication network according to the present invention does not need to control data transmission timings of the transceivers, and hence can be assembled at low cost. In addition, the plurality of transceivers is able to transmit data at the same time, and therefore the throughput increases.

BRIEF DESCRIPTION OF THE DRAWINGS

Further objects and advantages of the present invention will be described with reference to the attached drawings below.

FIG. 1 is a conceptual diagram of the optical communication network according to the present invention;

FIG. 2 is a block diagram showing the internal constitution of the accommodation device and communication terminal shown in FIG. 1;

FIG. 3 is a block diagram that schematically shows the internal constitution of an OCDM terminal according to a first embodiment;

DESCRIPTION OF THE PREFERRED EMBODIMENTS

Figure 4A:
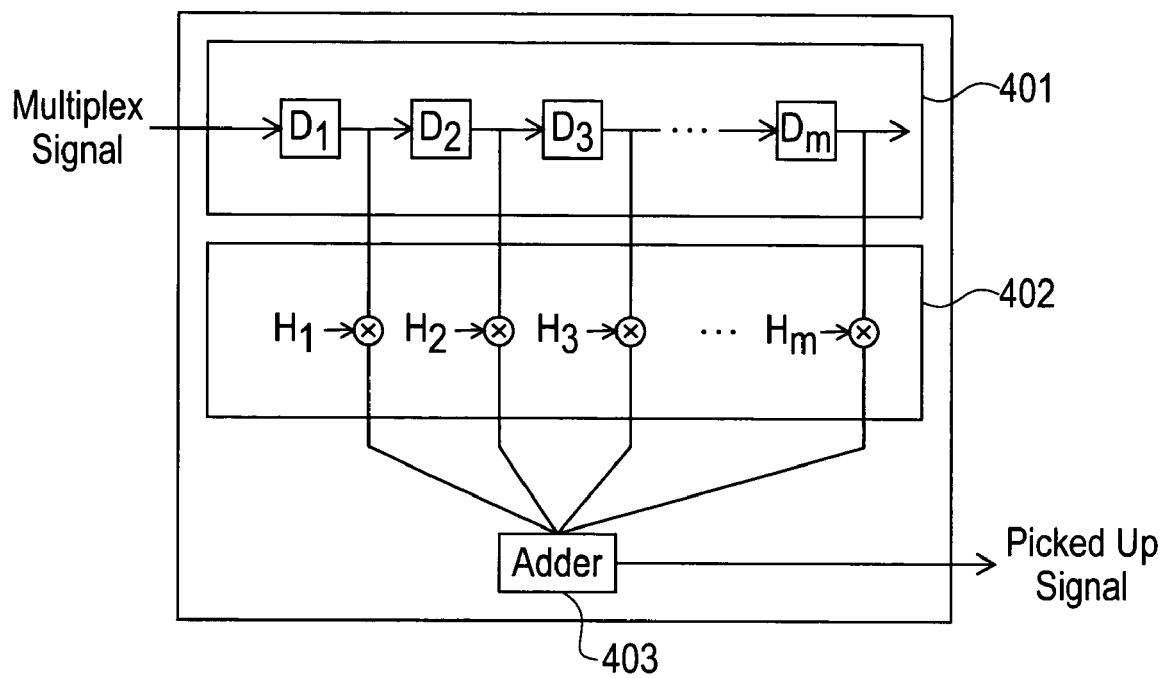
FIGS. 4A and 4B are block diagrams showing an example of the internal constitutional of the correlator shown in FIG. 3.

Embodiments of the present invention will be described below by using the drawings. In the drawings, the size, shape and dispositional relationship of each component is merely shown schematically so as to permit an understanding of the present invention, and the numerical conditions described below are only illustrative examples.

First Embodiment

The first embodiment of the present invention will now be described by taking an example in which the present invention is applied to a gigabit Ethernet communication network.

FIG. 1 is a block diagram that schematically shows the overall constitution of the optical communication network relating to this embodiment. Further, FIG. 2 shows the internal constitution of the accommodation device and communication terminals of FIG. 1. Only the constitution corresponding to a single port of the accommodation device is shown in FIG. 2.

As shown in FIG. 1, the optical communication network 100 relating to this embodiment comprises an accommodation device 110; a plurality of optical couplers 130, 130, . . . ; a plurality of communication terminals 120-1 to 120-n; electrical transmission paths 141, 144; and optical transmission paths 142, 143. As will be described subsequently, according to this embodiment, OCDM (Optical Code Division Multiplexing) technology is employed for uplink direction (the direction from the communication terminal to the accommodation device) communication, and TDM (Time Division Multiplexing) technology is used for downlink direction (the direction from the accommodation device to the communication terminal) communication.

The accommodation device 110 comprises a switch 111, a Giga Ether Transceiver 112, and an OCDM terminal 113.

The switch 111 is a relay such as a switching hub, a layer 2 switch, or a layer 3 switch. The switch 111 comprises a plurality of ports and outputs data (MAC frame) that is received from any port via another port. The output port is determined in accordance with the destination information stored in the header of the MAC frame. The switch 111 may be connected to a higher order network via a router or similar.

The Giga Ether Transceiver 112 is connected to each port of the switch 111. The switch 111 sends and receives MAC frames via the Giga Ether Transceiver 112.

The OCDM terminal 113 is connected to the optical couplers 130 via the optical transmission path 142, and is connected to the Giga Ether Transceiver 112 via the electrical transmission path 141. The OCDM terminal 113 receives an optical signal that has been time-division multiplexed from the optical coupler 130, converts this optical signal into an electrical signal that is multiplexed by using TDM technology, and then transmits this signal to the Giga Ether Transceiver 112. Here, the OCDM terminal 113 judges whether the optical signal received from the optical coupler is normal or abnormal, and, upon judging this optical signal to be abnormal, informs communication terminals 120-1 to 120-n of the judgment result (described subsequently). In addition, the OCDM terminal 113 receives an electrical signal that has been multiplexed by using TDM technology from the Giga Ether Transceiver 112, converts this electrical signal into an optical signal, and transmits this signal to the optical coupler 130. The OCDM terminal 113 corresponds to 'terminal' of the present invention. The constitution of the OCDM terminal 113 will be described by using FIGS. 3, 4A, and 4B.

The communication terminal 120-1 comprises an OCDM transceiver 121-1, a 10/100 Base-T Transceiver 122-1, and a personal computer 123-1.

The OCDM transceiver 121-1 is connected to the optical coupler 130 via the optical transmission path 143 and is connected to the 10/100 Base-T Transceiver 122-1 via the electrical transmission path 144. The OCDM transceiver 121-1 receives an electrical signal from the 10/100 Base-T Transceiver 122-1, converts this electrical signal into an spread optical signal, and sends this spread optical signal to the optical coupler 130. A spreading code C1 of CDM technology is used for this spreading. The spreading code C1 is stored in the OCDM transceiver 121-1. In addition, an OCDM transceiver 121-1 receives an optical signal from the optical coupler 130, converts this optical signal into an electrical signal, and transmits this electrical signal to the 10/100 Base-T Transceiver 122-1.

The 10/100 Base-T Transceiver 122-1 is connected to the personal computer 123-1. The 10/100 Base-T Transceiver 122-1 is an ordinary Ethernet transceiver. A commercially available LAN card, for example, can be used as the 10/100 Base-T Transceiver 122-1. The transceiver 121-1 and the transceiver 122-1 perform communications of the data link layer of the OSI (Open Systems Interconnection) reference model.

The personal computer 123-1 is an ordinary personal computer equipped with a network function.

The communication method of the transceivers 121-1 to 121-n and the transceivers 122-1 to 122-n need not be 10/100 Base T. Furthermore, the transceivers 131-1 to 131-n and the transceivers 132-1 to 132-n may be directly connected to one another rather than being connected via cables. In addition, the OCDM transceivers 131-1 to 131-n may be installed in a personal computer with a built-in LAN card.

The constitution of the communication terminals 120-2 to 120-n is the same as the constitution of the communication terminal 120-1. In other words, the constitution of the OCDM transceivers 121-2 to 121-n is the same as that of the OCDM transceiver 121-1, and the constitution of the 10/100 Base-T transceivers 122-2 to 122-n is the same as that of the 10/100 Base-T Transceiver 122-1. The constitution of the personal computers 123-2 to 123-n is the same as that of the personal computer 123-1. However, the spreading codes C1 to Cn used for the signal spreading differ for each of the OCDM transceivers 121-1 to 121-n. OCDM transceivers which are accommodated in the same OCDM terminal 113 cannot use the same spreading code. For example, if spreading codes C1 to Cn are created on the basis of a MAC address, a mistake where the same spreading code is stored in different OCDM transceivers can be prevented. The spreading codes C1 to Cn may be stored during the fabrication of the OCDM transceivers 121-1 to 121-n and may be set manually when the optical communication system 100 is assembled. The OCDM transceivers 121-1 to 121-n correspond to 'transceiver' of the present invention. The constitution of the OCDM transceivers 121-2 to 121-n will be described subsequently by using FIG. 5.

The optical coupler 130 couples optical signals that are received from the communication terminals 120-1 to 120-n, and transmits the coupled optical signals to the accommodation device 110. In addition, the optical couplers 130 transmit optical signals received from the accommodation device 110 to each of the communication terminals 120-1 to 120-n.

The electrical transmission paths 141, 144 are transmission paths for transmitting electrical signals, and are metal cables such as twisted pair cables, for example. In addition, a wireless transmission path may be used for the transmission paths 141, 144. The optical transmission paths 142, 143 are transmission paths for transmitting optical signals and are glass cables. The transmission paths 141 to 144 may use communication lines that are the same as for uplink direction and downlink direction communication or may use different communication lines. A single optical communication line is a single optical fiber provided in an optical cable. As described above, the OCDM terminal 113 sends a control signal that indicates a judgment that the optical signal is abnormal to the communication terminals 120-1 to 120-n. When different communication lines are employed for uplink direction and downlink direction communications, the control signal is transmitted by using the downlink direction communication line. On the other hand, it is desirable that, when the same communication line is employed for uplink direction and downlink direction communications, a control communication line be further provided. This is because when the same communication line is used for uplink direction and downlink direction communications, there is the risk that downlink direction communication cannot be performed normally when an anomaly with uplink direction communication occurs.

FIG. 3 is a block diagram that schematically shows the internal constitution of the OCDM terminal 113. As shown in FIG. 3, the OCDM terminal 113 comprises an O/E converter 301, correlators 302-1 to 302-n, a decision circuit 303, a buffer 304, a MUX circuit 305, and an E/O converter 306.

The O/E converter 301 converts an optical signal that is input via the transmission path 142 into an electrical signal.

The correlators 302-1 to 302-n receive an input of an electrical signal from the O/E converter 301. The same electrical signal is input to each of the correlators 302-1 to 302-n. The correlator 302-1 performs de-spreading that corresponds with the spreading code C1. Thus, the OCDM transceiver 121-1 is able to pick up only signals spread using the spreading code C1 from the multiplexed electrical signal. Likewise, the correlators 302-2 to 302-n perform de-spreading that corresponds with spreading codes C2 to Cn.

FIG. 4A is a block diagram showing a constitutional example of the correlators 302-1 to 302-n. FIG. 4A shows a constitutional example of an analog correlator known as a matched filter. The matched filter can be constituted by using a CCD (Charge Coupled Device), for example. As shown in FIG. 4A, the matched filter comprises a shift register 401, a code arithmetic circuit 402, and an adder 403. The shift register 401 comprises plural-stage registers D1 to Dm. The code arithmetic circuit 402 multiplies the output signal of each of the registers D1 to Dm by a coefficient H1 to Hm. The coefficients H1 to Hm are determined in accordance with the above-described spreading codes C1 to Cn. The adder 403 calculates the sum of the multiplication results of the code arithmetic circuit 402. The result of the calculation by the adder 403 is the result of a correlation operation.

Figure 4B:
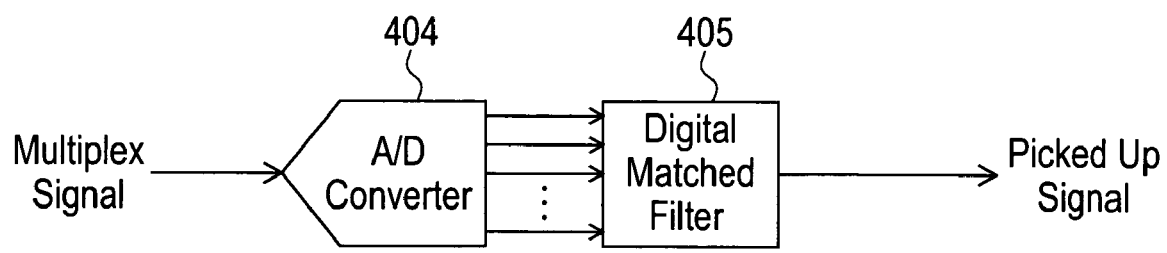

FIG. 4B is a block diagram showing another constitutional example of the correlators 302-1 to 302-n. The correlator in FIG. 4B comprises an analog/digital converter 404 and a digital matched filter 405. The analog/digital converter 404 converts an electrical signal into a digital electrical signal. The digital matched filter 405 performs a de-spreading operation on the digital electrical signal.

The decision circuit 303 decides whether the signals that are output by the correlator 302-1 to 302-n are normal MAC frames. As described above, this embodiment employs OCDM technology for the multiplexing of the uplink direction signals. There is a limit on the number of signals that can be multiplexed by using OCDM technology. When the multiplexed number exceeds this limit, the multiplexed data is destroyed. The decision circuit 303 decides whether the multiplexed number exceeds this limit. CSMA/CD (Carrier Sense Multiple Access with Collision Detection) technology, which is used in a conventional optical communication network (Ethernet or similar) can be used for this decision. CSMA/CD is technology that is used in the scanning of time-division multiplexed signals and is technology for deciding whether or not data destruction caused by collision has been generated. In this decision, there is no need to check user information and the like that is stored in the payload of a MAC frame. It is sufficient to simply check the structure and so forth of the MAC header. As described above, upon deciding that a signal is abnormal, the decision circuit 303 notifies the communication terminals 120-1 to 120-n of the decision result.

The buffer 304 receives normal MAC frames from the decision circuit 303 and temporarily stores these MAC frames.

The MUX circuit 305 reads the MAC frames that have been stored in the buffer 304 at predetermined intervals and outputs these frames to the transmission path 141. Thus, the MAC frames are time-division multiplexed and then sent to the Giga Ether Transceiver 112.

The E/O converter 306 converts an electrical signal that is input via the transmission path 141 into an optical signal. As described earlier, the optical communication system 100 of this embodiment time-division multiplexes a downlink direction optical signal. Here, the MAC frames that are output via the switch 111 have already been time-division multiplexed. Hence the OCDM terminal 113 simply converts an electrical signal received via the Giga Ether Transceiver 112 into an optical signal and sends the converted signal to the optical coupler 130.

Figure 5:
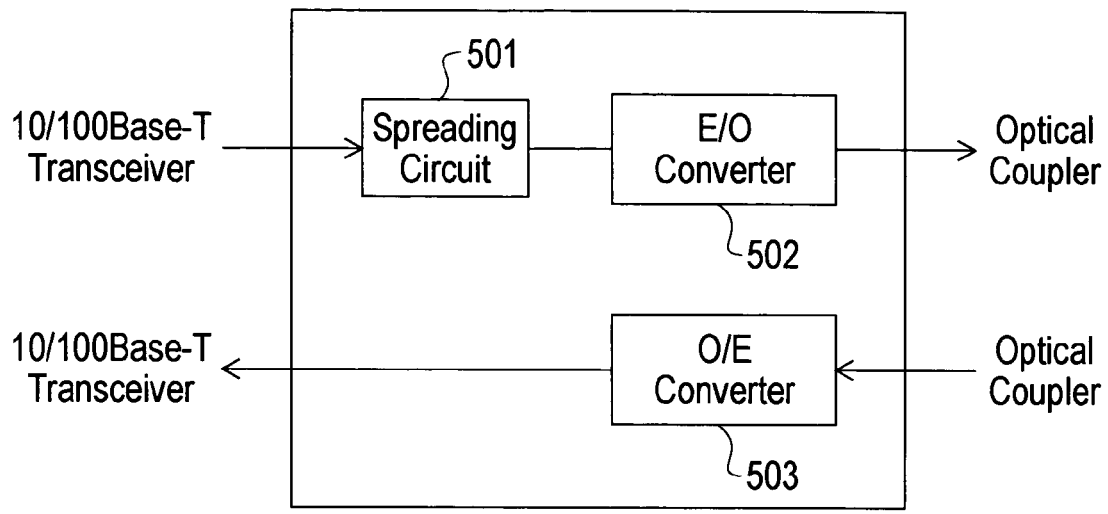
FIG. 5 is a block diagram that schematically shows the internal constitution of an OCDM transceiver according to the first embodiment.

FIG. 5 is a block diagram that schematically shows the constitution of the OCDM transceivers 121-1 to 121-n. As shown in FIG. 5, the OCDM transceiver of this embodiment comprises a spreading circuit 501, an E/O converter 502, and an O/E converter 503.

The spreading circuit 501 receives electrical signals from the corresponding 10/100 Base-T Transceiver. Then, these electrical signals are spread by using the spreading code C1.

The E/O converter 502 converts the spread electrical signal into an optical signal and sends this optical signal to the optical coupler 130.

The O/E converter 503 receives a time-division multiplexed optical signals from the optical coupler 130, and convert the optical signals into electrical signals. Then, the O/E converter 503 transmits electrical signals to the corresponding 10/100 Base-T Transceiver.

Next, the operational principles of the optical communication network 100 relating to this embodiment will be described.

When the user of the personal computer 123-1 accesses the optical communication network 100, uplink direction communications are executed between the communication terminal 130-1 and the switch 111. As described above, OCDM technology is employed in uplink direction multiplexing.

A MAC frame is transmitted by the personal computer 123-1 as an electrical signal and is received by the OCDM transceiver 121-1 via the 10/100 Base-T Transceiver 132-1 and the transmission path 144. As described above, the spreading circuit 501 in the OCDM transceiver 121-1 performs a spreading operation on the received MAC frame by using the spreading code C1 (see FIG. 5). The result of this spreading operation is converted to an optical signal by the E/O converter 502 and transmitted to the optical coupler 130 via the transmission path 143.

Similarly, there is a case the MAC frames which have undergone the spreading process and have been converted into an optical signals are transmitted to the optical coupler 130 by one or more other communication terminals 120-2 to 120-n with optional timing.

The optical couplers 130 multiplexes the optical signals thus received from the OCDM transceivers 121-1 to 121-n. This multiplexing simply involves the superposition of optical signals that are received at the same time. In this way, code division multiplexing of signals is executed. The superposed optical signals are transmitted to the OCDM terminal 113 via the optical transmission path 142.

The MAC frames thus input to the OCDM terminal 113 as optical signals are converted into electrical signals by the O/E converter 301 and separated by the correlators 302-1 to 302-n as described above. As detailed above, each of the OCDM transceivers 121-1 to 121-n performs a spreading operation by using different spreading codes C1 to Cn, and it is therefore possible to separate multiplexed MAC frames by means of the correlators 302-1 to 302-n the decision circuit 303 decides whether separated MAC frames are normal or abnormal.

Figure 6:
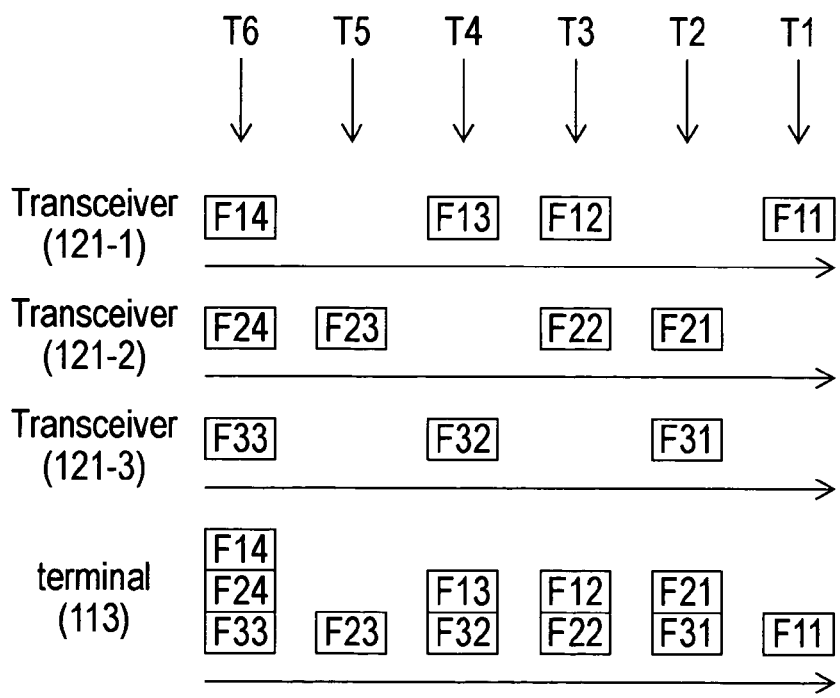
FIG. 6 is a conceptual view that serves to illustrate the operation of the optical communication network according to the first embodiment.

FIG. 6 is a conceptual view that serves to illustrate the decision by the decision circuit 303.

As described above, when the number of signals multiplexed by using OCDM technology exceeds the limit, data is destroyed. The decision circuit 303 decides whether or not the multiplexed number exceeds this limit by using CSMA/CD. The example of FIG. 6 makes this limit "2". In other words, when the number of multiplexed signals is 1 or 2, these signals are not destroyed. However, in the event of 3 or more signals, signal destruction occurs. This limit varies depending on the number of figures of spreading code.

At time T1 in FIG. 6, only the MAC frame F11 transmitted by the OCDM transceiver 121-1 is received by the OCDM terminal 113. Here, the number of multiplexed signals is "1", and hence data destruction does not occur. Therefore, the decision circuit 303 decides the data to be normal. As described above, MAC frames which are decided to be normal are temporarily stored in the buffer 304, time-division multiplexed by the MUX circuit 305, and then sent to the switch 111.

At time T2, the MAC frames F21, F31 that are transmitted by the OCDM transceivers 121-2, 121-3 are multiplexed and received by the OCDM terminal 113. Here, the number of multiplexed signals is "2" and hence data destruction does not occur. Therefore, the decision circuit 303 decides this data to be normal. These MAC frames are also time-division multiplexed and sent to the switch 111.

At times T3, T4, and T5, the number of multiplexed signals is "1" or "2" and hence data destruction does not occur. Therefore, the decision circuit 303 decides the data to be normal. These MAC frames are also time-division multiplexed and sent to the switch 111.

At time T6, the MAC frames F14, F24, and F33 transmitted by the OCDM transceivers 121-1, 121-2, and 121-3 are multiplexed and received by the OCDM terminal 113. Here, the number of multiplexed signals is "3" and hence data destruction occurs. Therefore, the decision circuit 303 decides this data to be abnormal. These MAC frames are discarded. The decision circuit 303 transmits the decision result to the communication terminals 120-1 to 120-n. After a designated time interval has elapsed, the communication terminals 120-1, 120-2, and 120-3 re-transmit the discarded MAC frames F14, F24, and F33. The waiting time interval up until MAC frame re-transmission differs from one communication terminal to the next. This waiting time interval is determined on the basis of a back-off algorithm, for example.

When the limit on the number of multiplexed signals is equal to or greater than the quantity n of communication terminals connected to the optical coupler 130, data anomalies do not occur. In this case, the decision circuit 303 is not necessary. However, because the spreading operation is complex, there is an increase in the circuit specifications of the spreading circuit 501 (see FIG. 5).

Next, the principles behind downlink direction communication, that is, communication from the switch 111 to each of the communication terminals 120-1 to 120-n will be described. As described above, TDM technology is used for downlink direction multiplexing.

When the MAC frames are transmitted from the switch 111 to the communication terminals 120-1 to 120-n, these MAC frames are time-division multiplexed by the switch 111. Hence there is no possibility of the transmission signals colliding. The time-division multiplexed MAC frames are converted into optical signals by the E/O converter 306 (see FIG. 3) in the OCDM terminal 113 and transmitted to the optical coupler 130. The optical coupler 130 transmits the same transmission signal to all of the OCDM transceivers 121-1 to 121-n. Each of the OCDM transceivers 121-1 to 121-n converts the received signal into an electrical signal by using the O/E converter 503 (see FIG. 5). The electrical signal is then sent to the corresponding personal computer. Each of the personal computers 123-1 to 123-n check the destination of the received MAC frames and then discard the MAC frames destined for other computers.

This embodiment has been explained by taking a communication network with star-type topology as an example. However, the present invention can also be applied to a bus-type communication network.

In a bus-type communication network, a plurality of optical couplers is provided on a single bus constituted by an optical transmission path. A single communication terminal is connected to each optical coupler. Each communication terminal comprises a spreader, a correlator, an E/O converter, an O/E converter, and a decision circuit, for example (see FIGS. 3 and 5). The OCDM terminal and OCDM transceivers are connected to the personal computers via an electrical transmission path and a 10/100 Base-T Transceiver. A coaxial cable, for example, is used as the electrical transmission path of the bus-type communication network.

In the case of a conventional bus-type communication network, each communication terminal is capable of detecting a data anomaly (i.e. collision). Further, when data is received at the same time as data is transmitted, data collision can be considered as having occurred. CSMA/CD is established such that an communication terminal which has detected data collision transmits a jam signal in order to notify the other communication terminals in the collision domain that collision has occurred. Meanwhile, with the optical communication network of the present invention, if the decision circuit (see FIG. 3) is constituted to notify the other communication terminals of the occurrence of an anomaly, the transmission of a jam signal is unnecessary. Further, when the communication terminals comprise correlators in the same quantity as the total number of communication terminals (see FIG. 3), a state where the number of multiplexed signals exceeds this limit can be directly detected.

With the optical communication network 100 of this embodiment, the communication terminals 120-1 to 120-n are not required to control the timing for transmitting the MAC frames. Therefore, the optical communication network 100 of this embodiment can be assembled at low cost.

In addition, the optical communication network 100 of this embodiment multiplexes the MAC frames by using OCDM technology and hence the uplink throughput can be increased.

Second Embodiment

Next, the second embodiment of the present invention will be described by using FIGS. 7 and 8.

With the optical communication network relating to this embodiment, the constitution of the OCDM terminal and OCDM transceivers differs from that of the network of the first embodiment.

Figure 7:
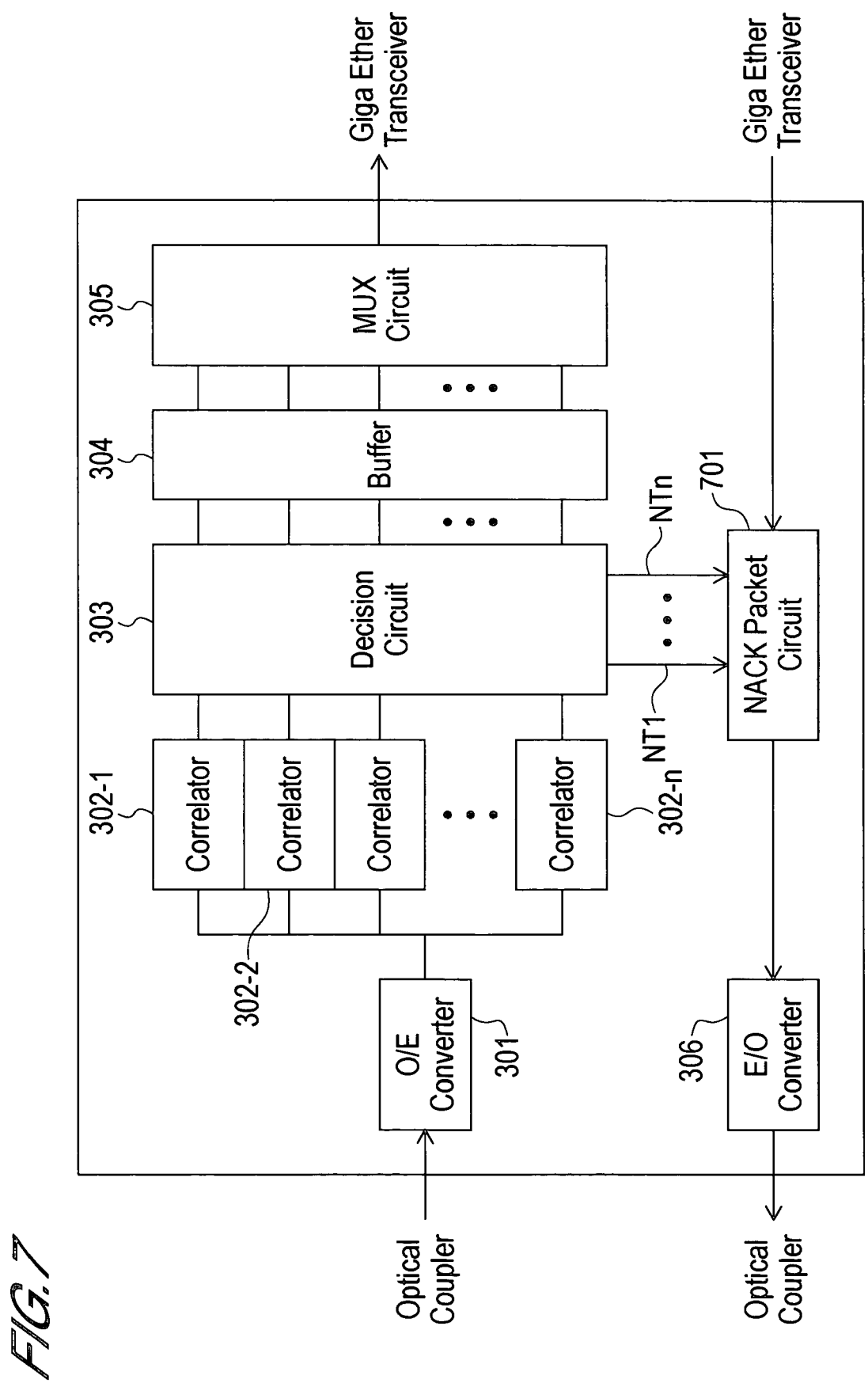
FIG. 7 is a block diagram that schematically shows the internal constitution of an OCDM terminal according to a second embodiment.

FIG. 7 is a block diagram showing the constitution of the OCDM terminal relating to this embodiment. In FIG. 7, the constituent elements assigned the same reference symbols as FIG. 3 are the same as those in FIG. 3.

As shown in FIG. 7, the OCDM terminal of this embodiment comprises a NACK packet assignment circuit 701.

When the decision circuit 303 decides that a data anomaly has occurred, the NACK packet assignment circuit 701 inputs data NT1 to NTn indicating this decision result. Then, a MAC frame in which information indicating this decision result is stored is generated and transmitted to the E/O converter 306. This MAC frame is converted into an optical signal by the E/O converter 306 and then output to an optical transmission path 412.

When the CSMA/CD protocol is followed, this MAC frame is sent to all the communication terminals 120-1 to 120-n (see FIG. 2) in the collision domain. For example, even when it has not been possible to normally extract the MAC frames output by the communication terminals 120-1 to 120-3, the other communication terminals 120-4 to 120-n are included in the transmission destinations for the MAC frame providing anomaly notification in addition to the communication terminals 120-1 to 120-3. This is because, normally, when the MAC frames are destroyed, the MAC frame transmission destinations cannot be ascertained.

A broadcast address can be used as the transmission address for the MAC frame providing anomaly notification. This is because, in the case of this embodiment, a star-type topology is adopted, and hence there is no risk of a MAC frame being sent to another collision domain even when a broadcast address is used.

However, the transmission origin of a destroyed MAC frame can be specified by managing the results of the operations of the correlators 302-1 to 302-n. When the communication terminal that transmitted the destroyed MAC frame can be specified, the MAC frame providing anomaly notification can be transmitted to this communication terminal alone.

A single MAC frame providing anomaly notification could also be transmitted, and the same MAC frame may be successively transmitted a plurality of times.

Figure 8:
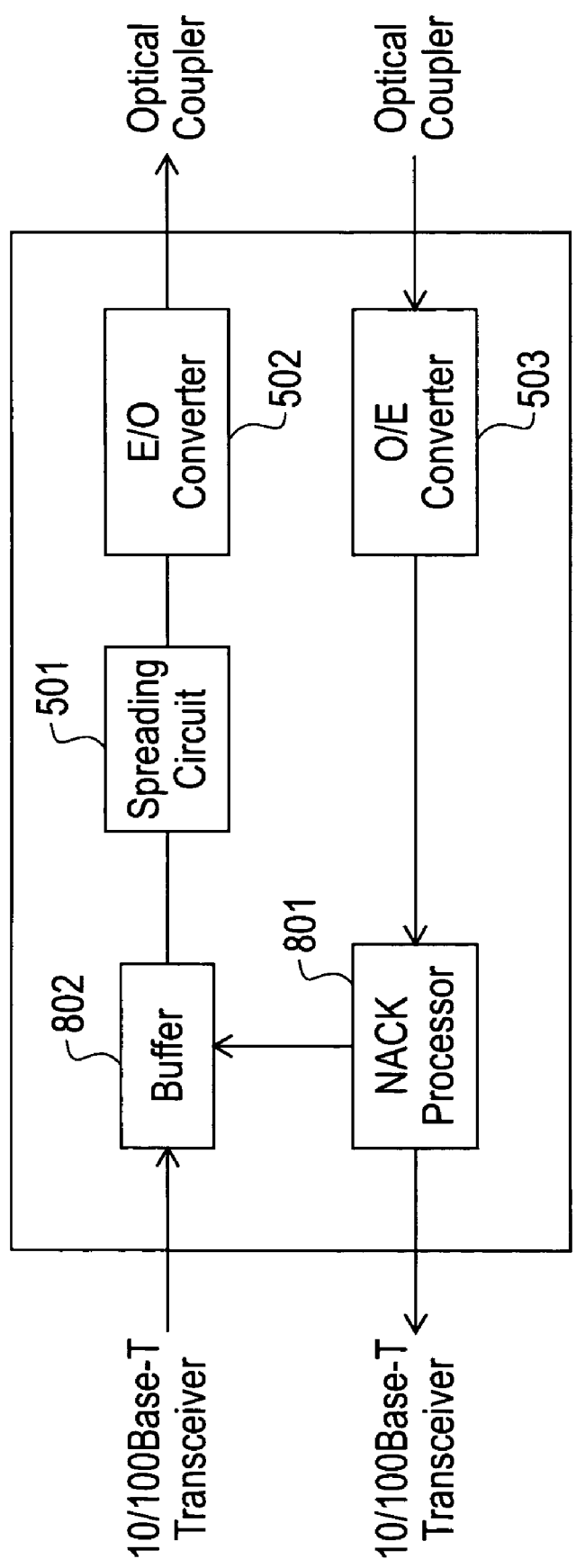
FIG. 8 is a block diagram that schematically shows the internal constitution of an OCDM transceiver according to the second embodiment.

FIG. 8 is a block diagram showing the constitution of the OCDM transceiver relating to this embodiment. In FIG. 8, the constituent elements assigned the same reference symbol as in FIG. 5 are the same as those of FIG. 5.

As shown in FIG. 8, the OCDM transceiver of this embodiment comprises an NACK processor 801 and a buffer 802.

The NACK processor 801 receives a MAC frame that has been converted into an electrical signal by the O/E converter 503. Then, when the decision result of the decision circuit 303 (that is, information indicating the occurrence of an anomaly) is stored in the MAC frame, the NACK processor 801 notifies the buffer 802 that an anomaly has occurred. On the other hand, when the decision result of the decision circuit 303 is not stored in the MAC frame, the NACK processor 801 sends this MAC frame to the 10/100 Base-T Transceiver.

The buffer 802 stores the MAC frames received via the 10/100 Base-T Transceiver as far as is possible. The MAC frames thus stored in the buffer 802 are sent to the spreading circuit 501 with predetermined timing. When notification of the occurrence of an anomaly has been received from the NACK processor 801, the buffer 802 judges whether or not the MAC frame corresponding to this anomaly is present. Further, when the corresponding MAC frame is present, the buffer 802 re-sends the MAC frame to the spreading circuit 501 after a predetermined waiting time interval has elapsed.

According to the optical communication network of this embodiment, it is possible to efficiently resend a MAC frame in the event of an anomaly by means of a simple constitution.

Third Embodiment

Next, the third embodiment of the present invention will be described by using FIGS. 9 and 10.

In the case of the optical communication network relating to this embodiment, the constitution of the OCDM terminal and OCDM transceivers differs from that of the network of the first embodiment.

Figure 9:
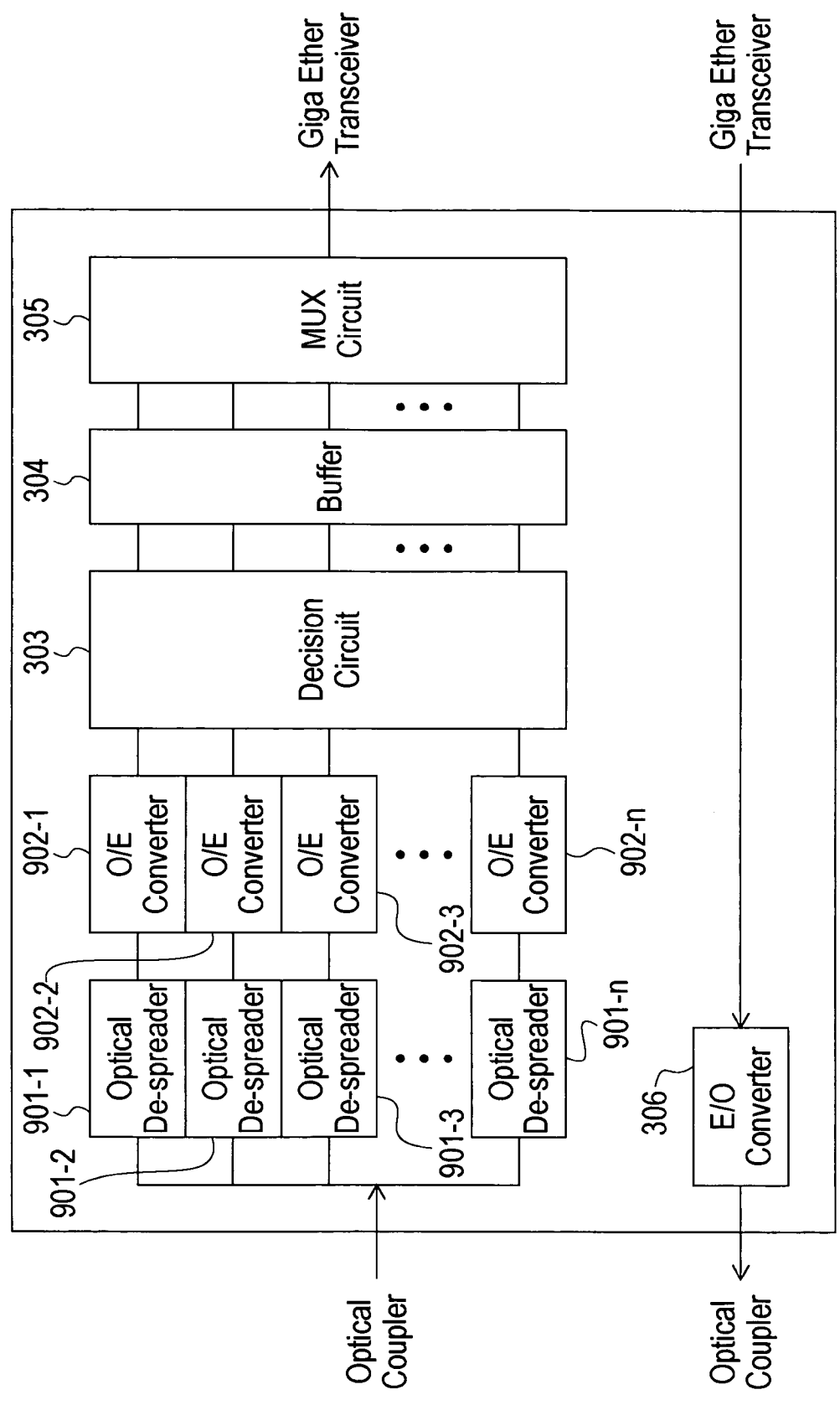
FIG. 9 is a block diagram that schematically shows the internal constitution of an OCDM terminal according to a third embodiment.

FIG. 9 is a block diagram showing the constitution of the OCDM terminal relating to this embodiment. In FIG. 9, the constituent elements assigned the same reference symbols as in FIG. 3 are the same as those of FIG. 3.

As shown in FIG. 9, the OCDM terminal of this embodiment comprises optical de-spreaders 901-1 to 901-n and O/E converters 902-1 to 902-n.

The optical de-spreaders 901-1 to 901-n receive an input of an optical signal from the optical transmission path 142. The same optical signal is input to each of the optical de-spreaders 901-1 to 901-n. The optical de-spreader 901-1 performs de-spreading that corresponds with the spreading code C1. As a result, the OCDM transceiver 121-1 is able to pick up only signals that are spread using the spreading code C1 from the time-division multiplexed electrical signal. Likewise, the optical de-spreaders 901-2 to 901-n perform de-spreading that corresponds with spreading codes C2 to Cn.

The O/E converters 902-1 to 902-n convert the de-spreading results that are inputted by the optical de-spreaders 901-1 to 901-n into electrical signals and send these electrical signals to the decision circuit 303.

Figure 10:
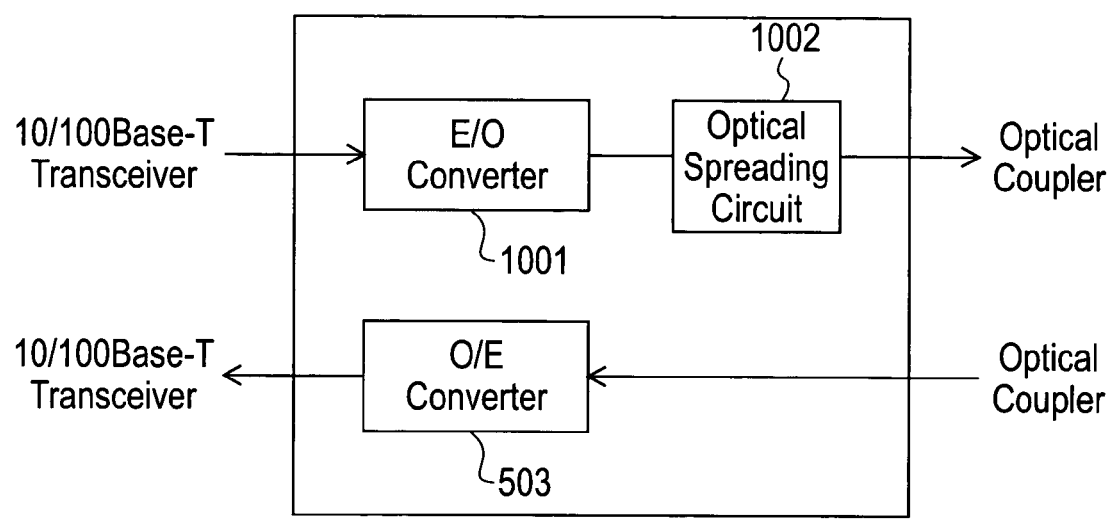
FIG. 10 is a block diagram that schematically shows the internal constitution of an OCDM transceiver according to the third embodiment.

FIG. 10 is a block diagram showing the constitution of the OCDM transceiver relating to this embodiment. In FIG. 10, the constituent elements assigned the same reference symbols as in FIG. 5 are the same as those of FIG. 5.

As shown in FIG. 10, the OCDM transceiver of this embodiment comprises an E/O converter 1001 and an optical spreading circuit 1002.

The E/O converter 1001 receives an electrical signal input from the 10/100 Base-T Transceiver 122-1 and converts this electrical signal into an optical signal. This optical signal is then sent to the optical spreading circuit 1002.

The optical spreading circuit 1002 uses the spreading code C1 to encode the optical signal thus inputted by the E/O converter 1001. As a method for encoding the optical signal, a method that changes the multiple wavelength generation order, for example, that is, wavelength hopping, can be employed. An encoded optical signal is sent to the optical coupler 130.

When optical-signal spreading and de-spreading are performed, the time interval required for the operation process is shortened and thus the data rate is faster than when electrical-signal spreading and de-spreading are performed. By performing optical-signal spreading and de-spreading, a 1-Gbps abnormal data rate is easily implemented.

Although CSMA/CD is used as the access control method in the first to third embodiments, other methods, such as 100VG-AnyLAN, for example, can be used. That is, as long as OCDM technology can be used, the access control method can be freely selected. Sometimes the upper limit for the number of signals that can be multiplexed is not identified with OCDM technology. This is because the upper limit varies according to the relationship of the spreading codes C1 to Cn and so forth. When CSMA/CD is used, the normality/abnormality of the signal is decided by using the de-spreading result, and hence there is no problem even when the upper limit is not identified. On the other hand, where 100VG-AnyLAN is concerned, the control device assigns transmission rights in accordance with a request from the communication terminal, and hence the upper limit must be identified beforehand.

The communication terminals 120-1 to 120-n can be substituted with a different kind of terminal. For example, server computers can be employed instead of the personal computers 123-1 to 123-n. The type of server computer is not limited, it being possible to adopt a mail server, a Web server, or a DNS server.

In the case of the first to third embodiments, settings are made during manufacture of the OCDM transceivers and OCDM terminal or during system assembly. However, by employing DHCP (Dynamic Host Configuration Protocol), the spreading codes can be set dynamically. DHCP is a protocol that automatically allocates the required information to a computer and is adopted for the automatic allocation of an IP address, a subnetmask, a default gateway and so forth, for example. While an ordinary DHCP is employed for the allocation of the parameters belonging to the network layer of the OSI reference model, the spreading code is a physical layer. However, the parameters of the physical layer can be obtained by extending the functions of DHCP. When DHCP is used, a DHCP server is provided in the optical communication network, and a client function may be added to the communication terminals 120-1 to 120-n. When DHCP is used, each of the communication terminals 120-1 to 120-n is dynamically allocated a spreading code at the start of communication and the spreading code is recovered after the communication ends. There is therefore no risk of the number of signals that can be multiplexed exceeding the upper limit.

Although the spreading operation and de-spreading operation are performed by hardware in the first to third embodiments, these calculations can also be carried out by software.

What is claimed is:

1. An optical communication network, comprising:
    a plurality of transceivers, each of which converts an inputted electrical signal into an optical signal that is spread by using a spreading code and then outputs this optical signal;
    an optical coupler, which inputs spread optical signals from the transceivers and multiplexes these signals; and
    a terminal that inputs the multiplexed optical signal from the optical coupler and convert the multiplexed optical signal to the pre-spreading electrical signals by using the spreading codes;
    wherein the optical communication network has a star-type topology that includes:
        an accommodation device in which the terminal is mounted;
        the optical coupler connected to the terminal; and
        a plurality of communication terminals which are connected to the optical coupler;
    wherein:
        the accommodation device comprises a plurality of ports;
        each of the ports is connected to a corresponding terminal;
        each of the terminals is connected to a corresponding optical coupler; and
        each of the optical couplers is connected to a corresponding plurality of transceivers;
    wherein each of the plurality of transceivers connected to the same optical coupler uses a mutually different spreading code;
    wherein the terminal performs signal separation of the optical signal by carrying out inversions which correspond to all the transceivers accommodated in the terminal;
    wherein the terminal time-division multiplexes a plurality of electrical signals obtained by the signal separation and then sending the time-division multiplexed signals to the accommodation device; and
    multiplexing of the terminal is performed by using:
        a buffer for temporarily storing electrical signals obtained by the signal separation; and
        a MUX circuit for sequentially reading out and transmitting electrical signals thus stored in the buffer.

2. The optical communication network according to claim 1, wherein the transceiver comprises:
    a spread operator for spreading an inputted electrical signal by using a spreading code; and
    an E/O converter for converting the result of the operation by the spread operator into an optical signal.

3. The optical communication network according to claim 2, wherein the terminal comprises:
    an O/E converter for converting an inputted optical signal into an electrical signal; and
    a correlator for subjecting an electrical signal inputted by the O/E converter to an inversion operation that corresponds with the spreading code.

4. The optical communication network according to claim 1, wherein the transceiver comprises:
    an E/O converter for converting an inputted electrical signal into an optical signal; and
    an optical spread operator for spreading an optical signal inputted by the E/O converter by using a spreading code.

5. The optical communication network according to claim 4, wherein the terminal comprises:
    an optical de-spreader for subjecting an inputted optical signal to an inversion operation that corresponds with the spreading code; and
    an O/E converter for converting an optical signal inputted by the optical de-spreader into an electrical signal.

6. The optical communication network according to claim 1, wherein a time-division multiplexed signal is transmitted by the accommodation device to the communication terminal via the optical coupler.

7. The optical communication network according to claim 6, wherein the terminal comprises an E/O converter for converting an electrical signal received from the switch into an optical signal and transmitting the optical signal to the optical coupler.

8. The optical communicatibn network according to claim 6, wherein the transceiver comprises an O/E converter for converting an optical signal received from the optical coupler into an electrical signal.

9. The optical communication network according to claim 1, wherein the limit on the number of signals that can be multiplexed is equal to or greater than the quantity of communication terminals connected to the optical coupler.

10. The optical communication network according to claim 1, wherein the spreading code is dynamically set for each of the transceivers by using the Dynamic Host Configuration Protocol.

11. The optical communication network according to claim 1, having a bus-type topology that includes a plurality of optical couplers connected via a bus; and a plurality of communication terminals which is connected to each of the optical couplers and in which the terminal and the transceiver are mounted.

12. An optical conmmnication network, comprising:
a plurality of transceivers, each of which converts an inputted electrical signal into a spread optical signal by using a spread code which is different from other spread codes used by other transceivers;
an optical coupler which inputs the spread optical signals from the transceivers and generates a code-division multiplexed optical signal by superposing the spread optical signals; and
a terminal that inputs the code-division multiplexed optical signal from the optical coupler, convert the code-division multiplexed optical signal to the time-division multiplexed electrical signal by using the spread codes, and send the time-division multiplexed electrical signal to the accommodation device;
wherein the terminal comprises:
an O/E converter which inputs the code-division multiplexed optical signal from the optical coupler, and converts the code-division multiplexed optical signal to the code-division multiplexed electrical signal,
a plurality of correlators, each of which inputs the code-division multiplexed electrical signal from the corresponding O/E converter, and separates the code-division multiplexed electrical signal by carrying out the inversions using the corresponding spread codes;
a buffer which temporarily stores separated electrical signals obtained by the correlators, and
a MUX circuit which sequentially reads out and transmitting the separated electrical signals stored in the buffer and thus generates and outputs the time-division multiplexed electrical signal.

13. An optical communication network, comprising:
a plurality of transceivers, each of which converts an inputted electrical signal into a spread optical signal by using a spread code which is different from other spread codes used by other transceivers;
an optical coupler which inputs the spread optical signals from the transceivers and generates a code-division multiplexed optical signal by superposing the spread optical signals; and
a terminal that inputs the code-division multiplexed optical signal from the optical coupler, convert the code-division multiplexed optical signal to the time-division multiplexed electrical signal by using the spread codes, and send the time-division multiplexed electrical signal to the accommodation device;
wherein the terminal comprises:
a plurality of correlators, each of which inputs the code-division multiplexed optical signal from the optical coupler, and separates the code-division multiplexed optical signal by carrying out the inversions using the spread codes;
a plurality of O/E converter, each of which inputs the separated optical signal, from the corresponding correlators, and converts the separated optical signal to the separated electrical signal,
a buffer which temporarily stores separated electrical signals obtained by the O/E converters, and
a MUX circuit which sequentially reads out and transmitting the separated electrical signals stored in the buffer and thus generates and outputs the time-division multiplexed electrical signal.

14. An optical communication network, comprising:
a plurality of transceivers, each of which converts an inputted electrical signal into a spread optical signal by using a spread code which is different from other spread codes used by other transceivers;
an optical coupler which inputs thespread optical signals from the transceivers and generates a code-division multiplexed optical signal by superposing the spread optical signals; and
a terminal that inputs the code-division multiplexed optical signal from the optical coupler, convert the code-division multiplexed, optical signal to the time-division multiplexed electrical signal by using the spread codes, and send the time-division multiplexed electrical signal to the accommodation device;
wherein the terminal comprises a judgment circuit for judging the normality/abnormality of an electrical signal obtained by means of the conversion.

* * * * *